Figure 1:
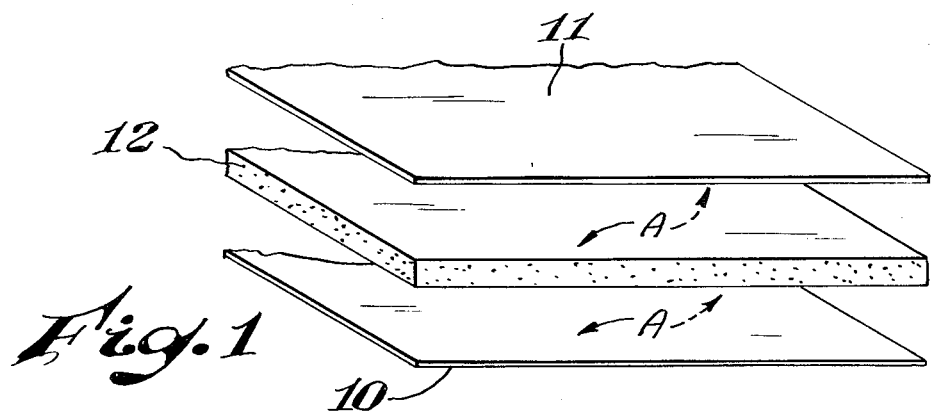

there should be a [!] logo here.

United States Patent [19]

Palfey et al.

[11] 4,078,959
[45] Mar. 14, 1978

[54] CURVED LAMINATE PANELS

[75] Inventors: Albert J. Palfey, Midland; William P. Hovey, Mt. Pleasant, both of Mich.

[73] Assignee: The Dow Chemical Company, Midland, Mich.

[21] Appl. No.: 657,774

[22] Filed: Feb. 13, 1976

[51] Int. Cl.² ................ B29C 27/10; B32B 1/00; B32B 5/18
[52] U.S. Cl. .................... 156/214; 156/222; 156/289; 264/259; 264/296; 264/321; 428/121; 428/313; 428/314; 428/322
[58] Field of Search ............ 156/78, 211, 212, 213, 156/214, 216, 201, 221, 222, 227, 289, 291; 264/242, 259, 294, 296, 321; 428/121, 194, 310, 313, 322, 314

[56] References Cited

U.S. PATENT DOCUMENTS

| 3,111,787 | 11/1963 | Chamberlain | 428/310 |
| 3,159,700 | 12/1964 | Nakamura | 264/321 |
| 3,160,549 | 12/1964 | Caldwell et al. | 428/313 |
| 3,284,260 | 11/1966 | Best | 156/212 |
| 3,687,774 | 8/1972 | Grubstad | 156/77 |
| 3,948,710 | 4/1976 | Harvey | 156/211 |

Primary Examiner—William A. Powell
Assistant Examiner—Thomas Bokan
Attorney, Agent, or Firm—R. B. Ingraham

[57] ABSTRACT

Curved sandwich panels having a plastic foam core are prepared by providing a flexibilized foam core, laminating inner and outer skins to the core. The outer skin is laminated to the core at locations other than where the panel will be curved, bending the panel to the desired shape and laminating the outer layer to the core.

2 Claims, 6 Drawing Figures

U.S. Patent    March 14, 1978    4,078,959

CURVED LAMINATE PANELS

Foam core sandwich panels are widely used in construction of specialized vehicle bodies, buildings, enclosures and the like. Oftentimes, it is desirable to have curved laminate panels having a plastic foam core. Many techniques have been developed for the preparation of curved sandwich panels. The most common is to apply the skins or facing sheets to the core, bend the entire assembly to the desired configuration and curing an adhesive to bond the facing sheets to the core. Another common way of preparing the curved foam laminated structures is to laminate one facing sheet to the foam core, bend the laminate in such a way that the adhered facing sheet is on the convex side of the bent panel and then laminating the remaining facing sheet to the concave side. Such a technique utilizes the tensile strength of the skin or facing sheet and crushes the foam core in the region of the curves. Some plastic foam laminates and applications therefore are shown in U.S. Pat. Nos. 2,770,406; 2,980,270; 3,284,260; 3,189,243; 3,284,260; and 3,687,774.

A particularly difficult curve to make in a sandwich panel having a foam plastic core is a relatively short radius bend adjacent one end or edge of the panel. Oftentimes, efforts to make such bends are unsuccessful in that there appears to be no place to apply the required amount of force without destroying a portion of the core, severely rupturing the core or resorting to the time-consuming expedient of slotting the core on the concave side of the curve to reduce the force required to form.

It would be desirable if there were available an improved method for formation of plastic foam cored sandwich panels having curved portions.

It would also be desirable if there were an improved method for forming foam cored sandwich panels having small radius bends which require relatively small quantities of labor and equipment.

It would also be desirable to have an improved method for the preparation of curved foam plastic cored sandwich panels which would permit the formation of small diameter bends adjacent the edges or sides of the panels.

These benefits and other advantages in accordance with the present invention are achieved in a method for the preparation of a foamed cored sandwich panel having a curved portion therein, the steps of the method comprising affixing a first or inner facing sheet to a flexibilized foam plastic core, affixing a second or exterior facing sheet to the foam plastic core in a region where it is not desired to bend the resultant panel, bending the core and first facing sheet to a desired configuration wherein the first facing sheet is disposed on the concave side of the bend, adhering any unadhered portion of the second facing sheet to the core in the bent region of the laminated panel.

By the term "flexibilized" is meant a plastic foam whose flexibility has been significantly increased by compression of the foam to a sufficient degree to cause wrinkling of at least some of the cell walls, for example, if a foam sheet 1 inch in thickness, 10 inches in width and 20 inches in length is compressed in a direction corresponding to its length to 18 inches, the foam becomes much more flexible than it was prior to such compression. Such flexibilized foam is well known and discussed at length in U.S. Pat. Nos. 3,159,700 and 3,191,224, the teachings of which are herewith incorporated by reference thereto. The method invention may be practiced using any plastic foam which may be flexiblized in accordance with the hereinbefore referred to teachings. Any suitable skin or facing sheets may be employed which are conventionally used to make curved sandwich panels. Metal, glass fiber reinforcing plastics, wood veneer, plywood, and the like, are among the commonly used materials. Any adhesive system may be employed which is satisfactory for the preparation of laminates from the unflexibilized foam and like facing sheets using a slip sheet. The appropriate adhesives for particular facings and cores are well known to those in the foam plastic panel laminating art.

FIGS. 1 through 6 schematically depict the preparation of a sandwich panel by the method of the present invention when a contact or pressure-sensitive adhesive is employed.

In FIG. 1 there is schematically shown a first or inner skin or facing sheet 10, a second or outer facing sheet 11 and a foam plastic core 12. The facing sheets 10 and 11 and the core 12 are generally identical in size and are ranged and spaced in parallel relationship. The surfaces of the facings and core indicated by the letters A and the solid and dotted arrows indicate surfaces to which a pressure sensitive adhesive has been applied.

Figure 2:
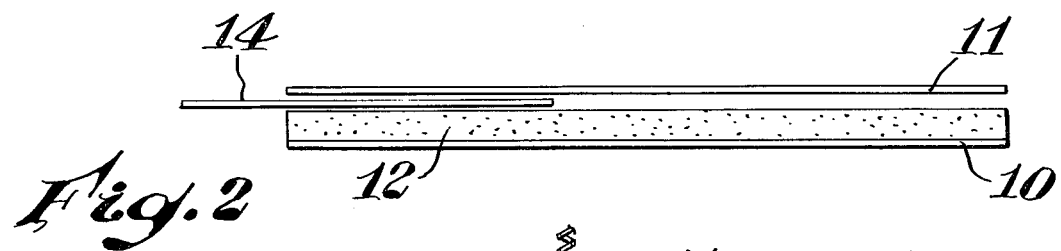

In FIG. 2, sheet 10 has been brought into contact with adjacent face of core 12. The outer facing sheet 11 is spaced from the core 12 and a slip sheet sheet indicated by the reference numeral 14 is disposed partially between the sheet 11 and the adjacent surface of the core 12.

Figure 3:
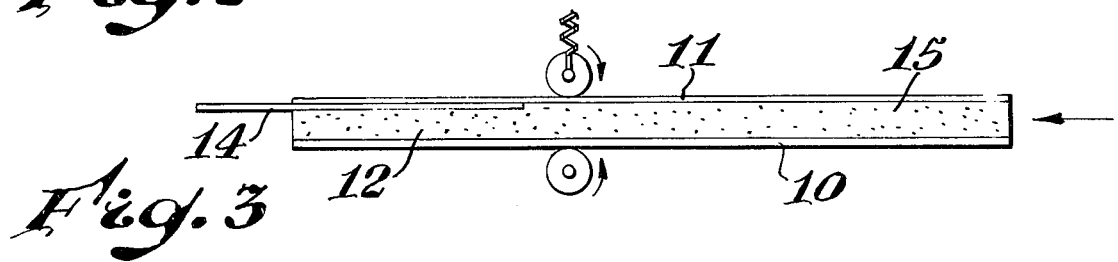

In FIG. 3 a panel 15 is formed by laminating together the facing sheets 10, 11 and the core 12. The slip sheet 14 is shown protruding from one end of the panel 15 preventing the adhesion of the adjacent portion of facing sheet 11 and the core 12.

Figure 4:
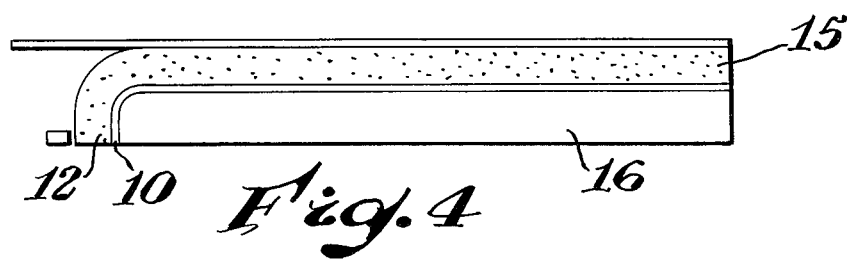

In FIG. 4 the sheet 15 has been positioned over a forming die and the core 12 and inner or convex facing 10 have been formed into the desired curved configuration of a die 16. The slip sheet is removed.

Figure 5:
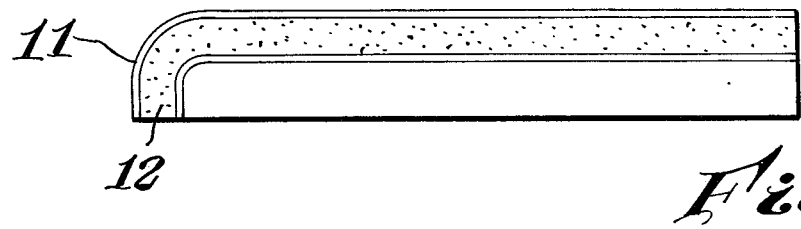

In FIG. 5 the unadhered portion of panel 11 has been bent over the core 12 to form the desired short radius curve.

Figure 6:
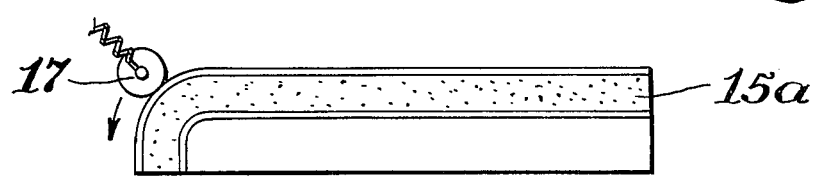

FIG. 6 the curved panel 15A formed from the panel of FIG. 5 has the unadhered portion of the facing 11 pressed against the core by means of a roll 17. Alternately a female die can be employed.

A plurality of curved laminates were prepared employing the method illustrated in FIGS. 1 through 6 using a 1 inch-thick extruded polystyrene foam having a density of about 1.9 pounds per cubic foot, facing sheets of aluminum having thicknesses of 19 mils and 24 mils. In preparing the laminates, a pressure-sensitive adhesive was sprayed onto the major faces of the polystyrene foam and the aluminum skin or facing panels to provide a coating weight of from about 2 to 3 grams per square foot of dry contact adhesive. In the spraying, a major portion of the solvent in the contact adhesive evaporates. Prior to lamination, the core and facing panels are permitted to air-dry to remove at least a major portion of any solvent which remains. The contact adhesives employed were commercially available and sold under the trade designation of Swift 7375 and National Starch G 701. The foam core had been compressed in a direction of the plane of the core to about 85 percent of its original length to flexibilize the core material. Laminating was accomplished by means of pinch rolls. A four mil-thick polyethylene film was employed as a slip sheet. A number of curved panels were prepared having a minimum radii curvature ranging as low as 5 inches. Other curved laminates were prepared wherein the procedure of steps 4, 5 and 6 were omitted and replaced by forcing the laminate into a female die having the desired curvature, removing the slip sheet with the die loosened slightly and pressing the panel into the die under a pressure of about 15 pounds per square inch.

Compounded or doubly curved panels can be prepared by the method of the present invention and the degree of curvature is limited by the nature of the facing sheet, as the facing sheet must be stretched. Dead soft aluminum skins have been found satisfactory for the preparation of compound curved panels using matching dies to deform the laminate components.

The method of the present invention permits the forming of laminate panels into cylinders, s-shaped panels and a wide variety of other irregularly curved panels.

As is apparent from the foregoing specification, the present invention is susceptible of being embodied with various alterations and modifications which may differ particularly from those that have been described in the the preceding specification and description. For this reason, it is to be fully understood that all of the foregoing is intended to be merely illustrative and is not to be construed or interpreted as being restrictive, or otherwise limiting of the present invention excepting as it is set forth and defined in the hereto-appended claims.

What is claimed is:

1. In a method for the preparation of a foamed cored sandwich panel having a curved portion therein, the steps of the method comprising affixing a first or inner facing sheet to a flexibilized foam plastic core, affixing a second or exterior facing sheet to the foam plastic core only in a region where it is desired not to bend the resultant panel, bending the core and first facing sheet to a desired configuration wherein the first facing sheet is disposed on the concave side of the bend, adhering any unadhered portion of the second facing sheet to the core in the bent region of the laminated panel.

2. The method of claim 1 wherein a slip sheet is disposed between the core and the adjacent portion of the exterior facing sheet and removing the slip sheet prior to adhering the unadhered portion of the second facing sheet to the core.

* * * * *